US011003648B2

(12) United States Patent
Glaser et al.

(10) Patent No.: US 11,003,648 B2
(45) Date of Patent: May 11, 2021

(54) SYSTEMS AND METHODS FOR USE IN LOADING DATA FROM BACKUP DATABASES TO TASK DATABASES

(71) Applicant: MASTERCARD INTERNATIONAL INCORPORATED, Purchase, NY (US)

(72) Inventors: Tom James Glaser, Ballwin, MO (US); Shankar Subramanian, Dardenne Prairie, MO (US); Kevin Michael Lyons, O'Fallon, MO (US); Zachary Widdicombe, St. Charles, MO (US); Clifford A. Kinnunen, Granite City, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 519 days.

(21) Appl. No.: 15/850,974

(22) Filed: Dec. 21, 2017

(65) Prior Publication Data

US 2019/0197142 A1 Jun. 27, 2019

(51) Int. Cl.
*G06F 16/25* (2019.01)
*G06F 16/22* (2019.01)
(Continued)

(52) U.S. Cl.
CPC .......... *G06F 16/2272* (2019.01); *G06F 11/14* (2013.01); *G06F 16/1805* (2019.01);
(Continued)

(58) Field of Classification Search
CPC .... G06F 16/2272; G06F 11/14; G06F 16/273; G06F 16/2379; G06F 16/25; G06F 16/1805; G06F 16/1865
See application file for complete search history.

(56) References Cited

U.S. PATENT DOCUMENTS 7,233,929 B1 * 6/2007 Lingle .............. G07B 17/00024
705/401
7,240,151 B1 * 7/2007 Todd ..................... G06F 16/152
711/108

(Continued)

FOREIGN PATENT DOCUMENTS

GB 2317972 A * 4/1998 ........... G06F 3/0677

OTHER PUBLICATIONS

Stolze, K (2013). Seamless integration of archiving functionality in OLTP/OLAP database systems using accelerator technologies. Datenbanksysteme für Business, Technologie und Web (BTW) 2036. Bonn: Gesellschaft für Informatik e.V.. (S. 383-402) (Year: 2013).*

*Primary Examiner* — Cheyne D Ly
(74) *Attorney, Agent, or Firm* — Harness, Dickey & Pierce, P.L.C.

(57) ABSTRACT

Systems and methods are provided for loading data from a database into a task database, via a stage database. One exemplary method includes accessing a backup database where the backup database includes multiple flat files and where each of the multiple flat files includes data and having a filename. The method also includes appending, by a computing device, the filename of one of the multiple flat files to an index stored in the computing device and changing a global variable associated with a data loader for the one of the multiple flat files to the filename. The method then further includes loading the data from the one of the multiple flat files into a stage database in memory of the computing device and transferring the loaded data in the stage database to a task database, thereby making the data available to queries associated with tasks relying on the loaded data.

15 Claims, 3 Drawing Sheets

(51) Int. Cl.
*G06F 16/18* (2019.01)
*G06F 11/14* (2006.01)
*G06F 16/27* (2019.01)
*G06F 16/23* (2019.01)

(52) U.S. Cl.
CPC ...... *G06F 16/1865* (2019.01); *G06F 16/2379* (2019.01); *G06F 16/25* (2019.01); *G06F 16/273* (2019.01)

(56) References Cited

U.S. PATENT DOCUMENTS

| | | | |
|---|---|---|---|
| 7,251,642 B1* | 7/2007 | Szeto | G16B 50/00 |
| 2002/0165821 A1* | 11/2002 | Tree | G06Q 20/04 |
| | | | 705/39 |
| 2007/0050415 A1* | 3/2007 | Armangau | G06F 3/0605 |
| 2014/0095443 A1* | 4/2014 | Draese | G06F 16/27 |
| | | | 707/661 |

* cited by examiner

SYSTEMS AND METHODS FOR USE IN LOADING DATA FROM BACKUP DATABASES TO TASK DATABASES

FIELD

The present disclosure generally relates to systems and methods for use in loading data from backup databases into task databases, and in particular, to loading data from backup databases into task databases through one or more stage databases.

BACKGROUND

This section provides background information related to the present disclosure which is not necessarily prior art.

In connection with payment network transactions, for a given payment network, a substantial volume of transaction data is generated, compiled, and stored in one or more data structures. The data structures may be utilized to perform certain operations related to the payment networks, such as, for example, clearing and settlement. Additional tasks, which may further rely on the transaction data, include, for example, fraud analytics, advertising analytics and/or incentives analytics. Often, the data structures are accessed for only the data included therein that is needed to perform the tasks, such that unnecessary or undesired data is not accessed. What's more, sizes of the data structures are known to impact the ability of computing device(s) to access the data in the data structures, whereby time to perform the tasks is often related to the sizes of the data structures. With that said, several tools exist for the management and/or handling of data structures having significant amounts of data included therein. One example tool is the IBM™ DB2 Analytics Accelerator (IDAA), by IBM™.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transaction data is often used by acquirers, payment networks, issuers, and/or others to manage and complete purchase transactions between consumers and merchants, and further as part of providing various services to determine insights into, characteristics of, or predictors associated with the consumers and/or the merchants involved in the purchase transactions. In connection therewith, the transaction data is typically represented in a substantial volume of files. Uniquely, the systems and methods herein provide for loading data from backup databases into task databases, through one or more stage databases, to help accommodate the substantial volume of files. In particular, for a given job, an access engine manages an index of data structures (or files) to be loaded into a task database, whereby the filenames of the data structures are appended to the index. When the filename is appended, the access engine calls a data loader associated with a stage database, whereby the data from a backup database is loaded to the stage database (as defined by the given job). Thereafter, when all the data structures are loaded to the stage database, the access engine then loads the contents of the stage database to the task database. With that said, and as described in more detail hereinafter, the task database, unlike the backup database, includes structures and/or indexing, which permit more efficient searching, access, and/or compilations of the different data structures loaded thereto, as compared to the backup database, thereby providing improvements over current technology and the added efficiencies discussed herein.

Figure 1:
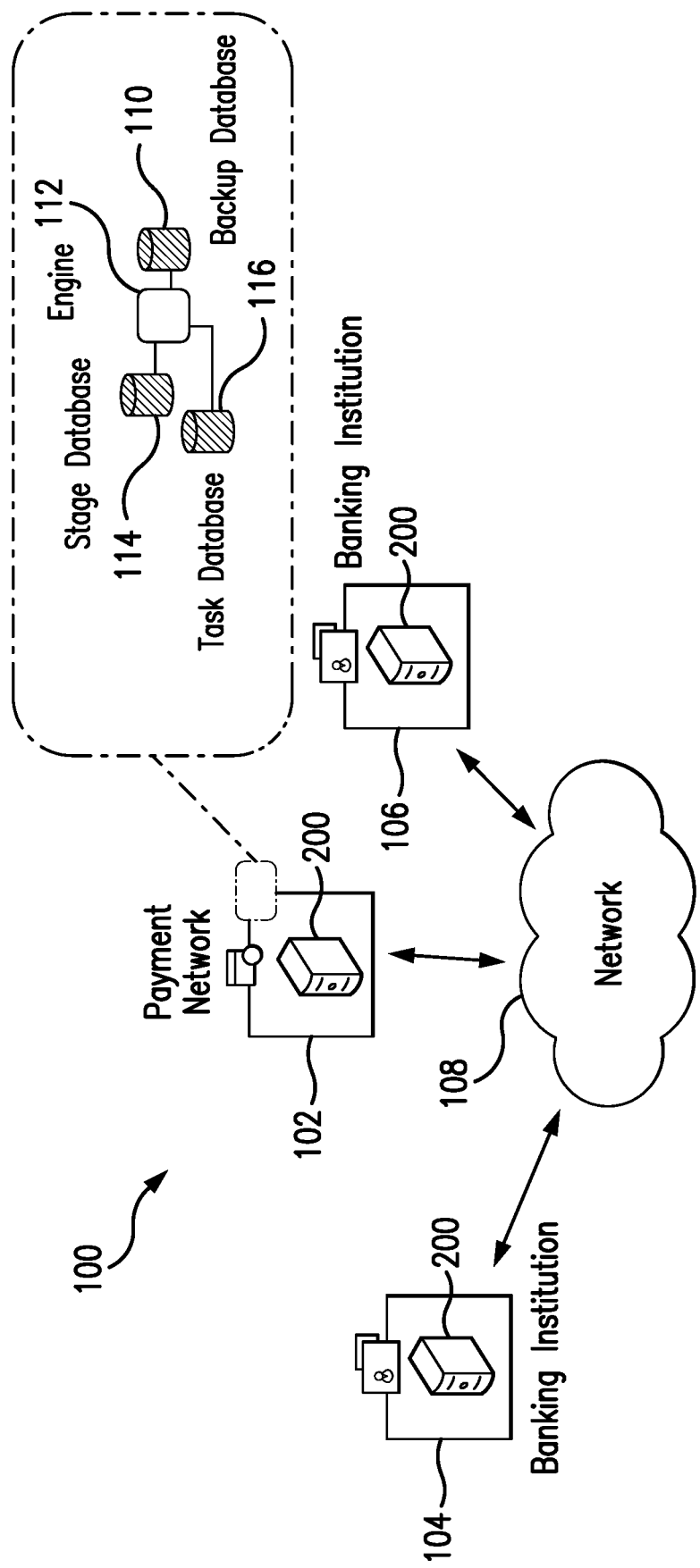
FIG. 1 illustrates an exemplary system of the present disclosure suitable for use in loading data from a database into a task database, via a stage database.

FIG. 1 illustrates an exemplary system 100 in which one or more aspects of the present disclosure may be implemented. Although parts of the system 100 are presented in one arrangement, other embodiments may include the same or different parts arranged otherwise, depending, for example, on applications and/or services involved therein, data warehouses available for access, etc.

The illustrated system 100 generally includes a payment network 102 and banking institutions 104 and 106, each coupled to network 108. The network 108 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts of the system 100, or even combinations thereof. In one example, the network 108 includes multiple networks, where different ones of the multiple networks are accessible to different ones of the illustrated components in FIG. 1. In particular, the payment network 102 and the banking institution 104 may be connected via a private network for processing transactions, and separately the payment network 102 may be connected to the banking institution 106 through a public network, such as the Internet.

Generally in the system 100, the banking institutions 104 and 106 include banks, issuers, acquirers, or other institutions, which participate in financial services related to banking, lending, insurance, and/or investment, etc. The payment network 102 and the banking institutions 104 and 106 therefore rely on transaction data exchanged therebetween to direct the exchange of funds, for example, in connection with the services. In particular, when a transaction is initiated between a customer and a merchant, where the customer and/or the merchant rely on services associated with one or both of the banking institutions 104 and 106, the transaction may initially be transmitted by the banking institution 104 (on behalf of the merchant) to the banking institution 106 (associated with issuing a payment account to the consumer) for authorization, for example, via the payment network 102, such as, for example, through Master-Card®, VISA®, Discover®, American Express®, etc. Then, if approved by the banking institution 106, the transaction may later be cleared and/or settled by and between the banking institutions 104 and 106 (via an agreement therebetween), as coordinated by the payment network 102. And, through the clearing and settlement of the transaction, funds are transferred between the banking institutions 104 and 106, again, as coordinated by the payment network 102.

In connection with the above example transaction and with other similar transactions in the system 100, transaction data is generated, collected, and stored as part of the interactions among the payment network 102 and the banking institutions 104 and 106. The transaction data represents at least a plurality of transactions, for example, authorized transactions, cleared transactions, attempted transactions, etc. The transaction data includes, for example, payment instrument identifiers such as payment account numbers, amounts of the transactions, merchant IDs, merchant category codes (MCCs), dates/times of the transactions, products purchased and related descriptions or identifiers, etc. It should be appreciated that more or less information related to transactions, as part of authorization, clearing, and/or settling, may be included in transaction data and stored within the system 100. That said, while various embodiments are described herein with reference to transaction data, other data, both related and/or unrelated to payment networks, etc., may be subjected to the description herein.

While only one payment network 102 and two banking institutions 104 and 106 are illustrated in the system 100 in FIG. 1 (for ease of reference), it should be appreciated that the system 100, and/or other system embodiments of the present disclosure, may include multiple ones of these parts in various combinations (as well as one or more additional parts). What's more, while not illustrated, it should be appreciated that the system 100 may include multiple merchants and consumers, etc.

Figure 2:
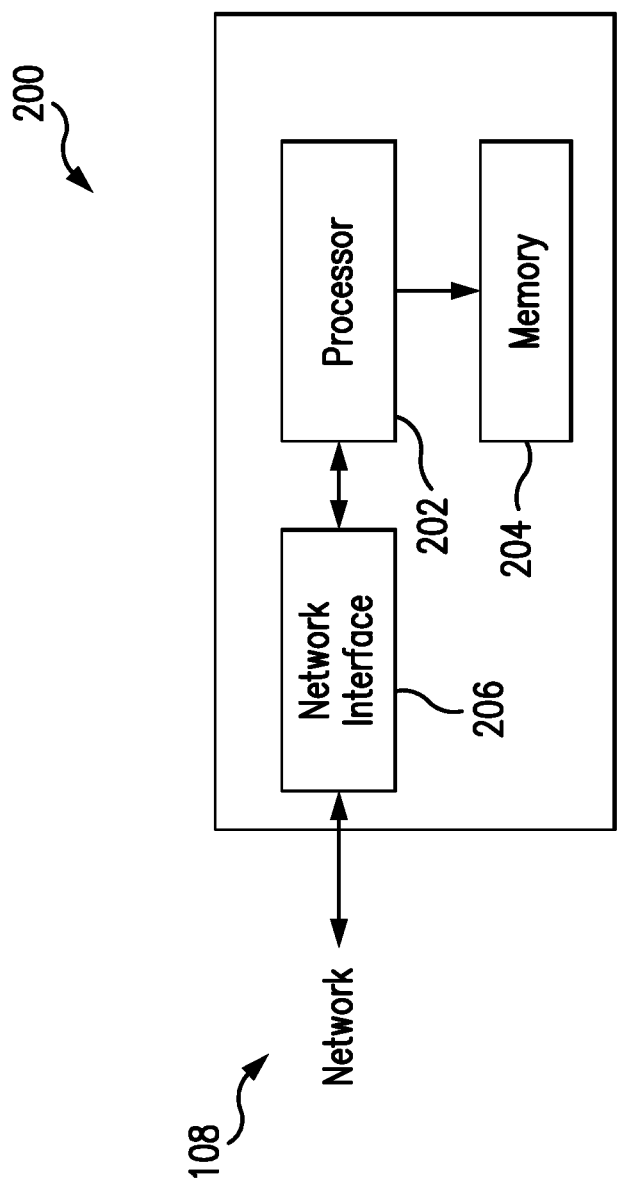
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. Further, different components and/or arrangements of components than illustrated herein may be used in the computing device 200 and/or in other computing device embodiments. In the exemplary embodiment of FIG. 1, each of, the payment network 102, and the banking institutions 104 and 106 are illustrated as including, or being implemented in or associated with, a computing device 200, coupled to the network 108. However, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data in a variety of databases in various formats (e.g., in flat file formats, etc.), and/or other types of data (and/or databases) suitable for use as described herein.

Furthermore, in various embodiments, computer-executable instructions may be stored in the memory 204 for execution by the processor 202 to particularly cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition, the illustrated computing device 200 also includes a network interface 206 coupled to (and in communication with) the processor 202 and the memory 204. The network interface 206 may include, without limitation, a wired network adapter, a wireless network adapter, a mobile network adapter, or other device capable of communicating to one or more different networks, including the network 108. Further, in some exemplary embodiments, the computing device 200 includes the processor 202 and one or more network interfaces incorporated into or with the processor 202.

Referring again to FIG. 1, the payment network 102 includes a database 110, which includes the transaction data for transactions involving the payment network 102 and which may be representative of hundreds, thousands, millions or more, or less, transactions, etc. The database 110 is generally a memory, consistent with the memory 204, which may be included in the computing device 200 of the payment network 102, or separate therefrom in one or more different computing devices. The database 110 may further be understood to be a backup database 110, which contains historical transaction data for purposes of verifying, proofing and/or otherwise evidencing the underlying transactions. In this manner, the backup database 110 is the structure into which transaction data is stored as the authorization, clearing and settlement of the transactions are concluded.

What's more, in this exemplary embodiment, the backup database 110 stores the transaction data in one or multiple flat files. The flat files generally include text or binary data. The flat files are generally defined as lacking structure for indexing and/or structural relationships between the contents or data included in the files. As such, in order to access the transaction data in one or more of the flat files, it is necessary to read the entire flat file or files into memory (e.g., into memory 204 of the computing device 200 associated with the payment network 102, etc.).

In addition, in this exemplary embodiment, the payment network 102 includes an access engine 112 in communication with the database 110 (and which may be included in the computing device 200 of the payment network 102, or as a standalone computing device separate therefrom). The access engine 112 is particularly configured to transfer the transaction data from the backup database 110 into a stage database 114 (in communication with the access engine 112), and then into a task database 116 (e.g., any suitable data structure (e.g., a table or base table, etc.), etc.) (also in communication with the access engine 112). In this exemplary embodiment, the stage database 114 and the task database 116 are included within (or are defined as) one or more structures accessible to an analytics accelerator such as, for example, an IDAA (or IBM DB2 Analytics Accelerator), which is a hardware appliance, provided by IBM, based on Netezza technologies, etc. The IDAA provides for use of an asymmetric massively parallel processing (AMPP) engine and hardware accelerators for fast query processing, and further may decompress and/or filter data for relevance and/or utilize zone maps on data parcels to reduce input/output on compressed data, etc. In this embodiment, the databases 114 and 116 are in the same physical computing device (e.g., the computing device 200 associated with the payment network 102, etc.), for example, but are logically separate. In other embodiment, the databases 114 and 116 may be distributed in different physical devices. The IDAA is configured to provide access to the data included in the databases 114 and 116 (e.g., through parallelism, etc.), to allow for processing of the data, and to allow for transferring of the data, as described herein, and further to provide compression of the transaction data.

More generally, the payment network 102 accesses historical transaction data, from time to time, to carry out one or more tasks related to, for example, auditing, analytics, research, transaction recovery, file creation for internal and/or external customers (e.g., for financial institutions 104 and 106, etc.), etc. One exemplary task includes interchange adjustments, in which charges associated with the interchange fee for transactions may be altered, as necessary and/or desired. Specifically, interchange adjustments (e.g., to address disputes and/or regulatory issues, etc.) may reallocate interchange fees between financial institutions to correct mistakes that have unjustly enriched one financial institution. An amount of the transaction generally will not change, but fees associated with the interchange for one financial institution typically increase accompanied by a corresponding decrease in fees for another financial institution. In order to carry out the interchange adjustment, it may be necessary to access, for example, approximately 160 different files, or seven clearing files per day, six days per week for four weeks (or generally a month), etc. It should be understood, for an exemplary interchange adjustment, the types and numbers of files may be selected based on one or more business reasons underlying the interchange adjustment tasks. Moreover, business reasons may also be provided for other tasks, which affect the number of files and/or data structures relied upon.

With regard to the interchange adjustment, the access engine 112 is configured to access the files containing the transaction data necessary to accomplish the task, which may include multiple, dozens or hundreds of files, including substantial numbers of transaction records. In particular, for example, the access engine 112 is configured to load data from the database 110 (related to the interchange adjustment task) into the stage database 114 (e.g., in memory 204 associated therewith, etc.), and then to the task database 116.

To do so, the access engine 112 is configured, for each file to be loaded, to append a filename for the file to an index of files for the load job, which includes confirming that the filename is not already stored in the index. If already included, the access engine 112 is configured to cancel the load job. In addition to appending the filename, the access engine 112 is configured to include the time and date, as well, thereby permitting a log related to the files or data structures being loaded to the stage database 114 to be compiled. Once the filename is added to the index, the access engine 112 is configured to change the global variable of the file (i.e., as defined in the IDAA data loader settings, etc.) to be the filename of the file.

Then, the access engine 112 is configured to load the files, from the backup database 110, to the stage database 114. Specifically, the access engine 112 includes one or more data loaders (e.g., IDAA data loaders, etc.), which are configured to identify and access data of a particular type or included within a particular file (or data structure), and to transfer the file from the backup database 110 to the stage database 114. It should be appreciated that the data loaders will be generally consistent, except that virtual mapping to read data from the source and/or to load data to the stage database 114 may be different for different file types (e.g., PI370 files versus MPE files, etc.). In connection therewith, the access engine 112 is configured to invoke the data loader(s) to identify the global variable of the file, to purge the part (e.g., table, subpart, etc.) into which the data is to be loaded and to load the data from the file into the part of the stage database 114. Once loaded into the stage database 114, the access engine 112 is configured to then transfer the data to the task database 116. It should be appreciated that the access engine 112 may be configured to load multiple different files to the stage database 114, and then to the task database 116, as described above. For example, for the exemplary interchange adjustment tasks above, the access engine 112 is configured to load four different files (e.g., an IP370 file (i.e., a clearing file associated with the payment network 102), an IPM (Integrated Process Management) file (i.e., a file format intended to handle multiple different record formats within the same file and logically permit the file to be interpreted, edited or updated), an MPE (Master/Card Parameters Extract) file, and a rate file, etc.), per interval, to the stage database 114, using four different IDAA data loaders, etc.

In connection therewith, if either changing the global variable, or loading the data into one of the databases, fails, the access engine 112 is configured to cancel the load job, thereby inhibiting the proliferation of bad and/or incomplete data in the stage database 114 and/or the task database 116.

Finally, once the load to the task database 116 is complete, the task database 116 is available to the computing device 200 of the payment network 102, or others, to query (e.g., via SQL queries related to merging and joining the different files, etc.) as desired, or required, to perform the tasks contemplated above (including, for example, the interchange adjustments, etc.).

Figure 3:
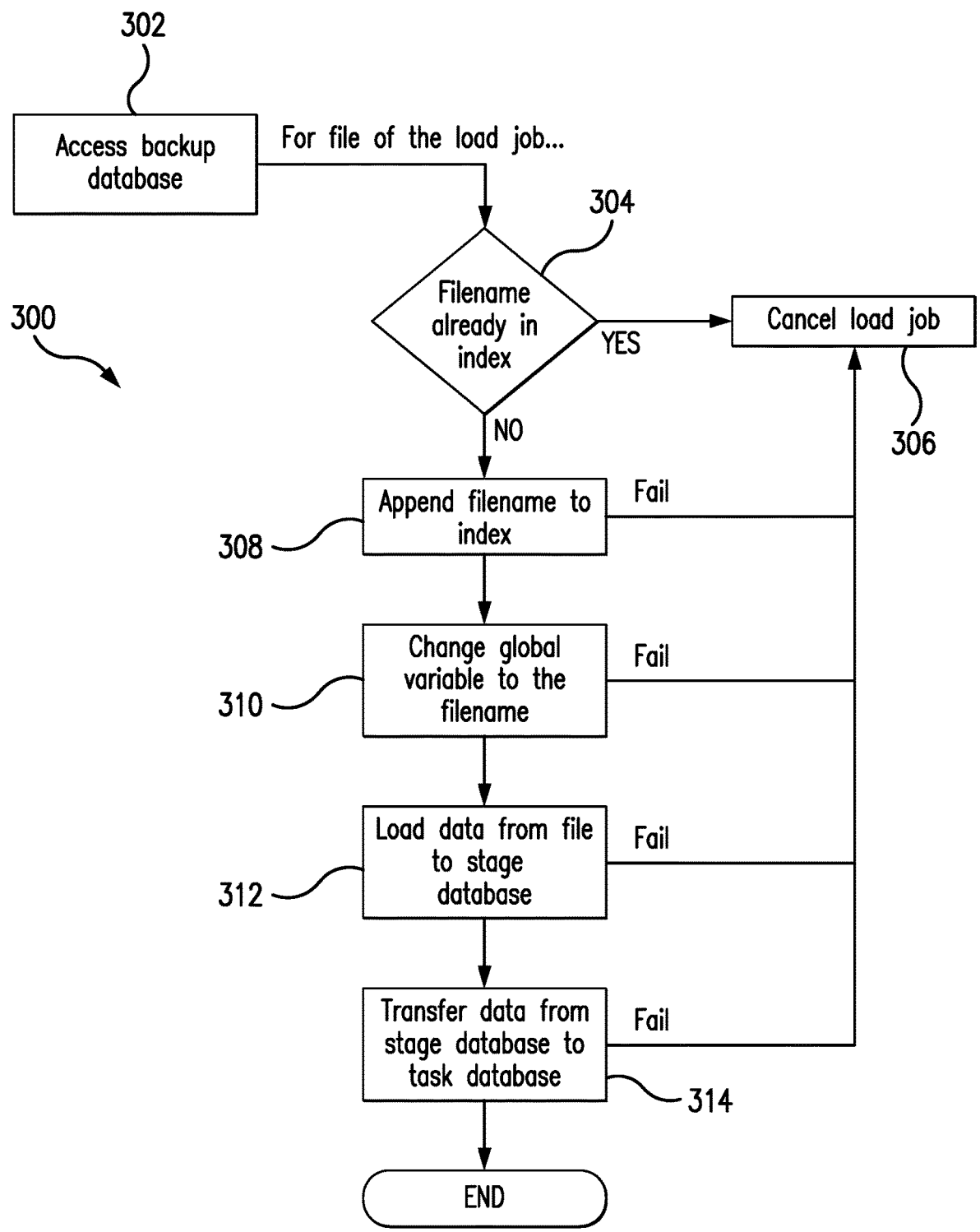
FIG. 3 is an exemplary method that may be implemented in connection with the system of FIG. 1 for loading data from the database into the task database, via the stage database.

FIG. 3 illustrates an exemplary method 300 for loading data from a database into a task database. The exemplary method 300 is described as implemented in the backup database 110, the access engine 112, the stage database 114, and the task database 116, etc. of the system 100, with additional reference to the computing device 200. However, it should be understood that the method 300 is not limited to this configuration of the specific database(s) and engine(s), as the method 300 may be implemented in one or more other parts of system 100, or in one or multiple other computing devices. As such, the methods herein should not be understood to be limited to the exemplary system 100 or the exemplary computing device 200, and likewise, the systems and the computing devices herein should not be understood to be limited to the exemplary method 300. Further, the methods herein should not be understood to be limited to transaction data, and may be applied in connection with any type of data within the scope of the present disclosure.

The method 300 is also described herein, in implementation, with reference to an exemplary load job related to interchange adjustment (broadly, a task), in which the method 300 is directed to loading four different data structures, including different data related to interchange adjustments, into the task database 116. In connection therewith in this example, the data structures are generated seven times per day and six days per week. The interchange advisement load job is related to January and February, and thus includes eight (or nine) weeks. It should be appreciated, however, that various other load jobs may be the subject of method 300.

As shown in FIG. 3, at 302 in the method 300, the access engine 112 initially accesses the backup database 110, and identifies the data structure to be compiled into the task database 116, based on one or more business reasons associated with the given task. As indicated above, the task, in this example, is an interchange adjustment for January and February. As such, the access engine 112, in this example, identifies the four different data structures related to the tasks, i.e., the IP 370, IPM, MPE, and rate data structures. The access engine 112 also identifies the interval at which the files are generated and stored, i.e., seven times per day and six days per week (each defined by a business reason) for both January and February.

Thereafter, for the first data structure (e.g., the IP370 file), which is a flat file, the access engine 112 determines, at 304, whether the filename for the first data structure is included in the index. If the filename is included in the index associated with the task database 116, the access engine 112 cancels the entire load job, at 306. If the filename is not included in the index, the access engine 112 appends, at 308, the filename of the data structure to the index, and then, at 310, changes the global variable to the filename of the first data structure (i.e., a setting for the IDAA for a virtual table used to read the flat file as a table structure).

Next, the access engine 112 loads (or load replaces), at 312, the data from the data structure (from the backup database 110) into the stage database 114. In particular, the access engine 112 invokes a data loader associated with the specific data structure to be loaded and also the stage database 114, which defines part of the IDAA, as described above. The data loader accesses the stage database 114 and purges all data in the data structure into which the data is to be loaded, and then appends and/or loads the data into the data structure therein. The appending includes reading data in the backup database 110 into memory (using the IDAA virtualization memory) and then loading the data into the IDAA table (using the load tables stored procedure) in the stage database 114. In general, the stage database 114 is utilized in method 300 for purposes of isolating the source database (e.g., the backup database 110, etc.) from the task database 116. In this manner, per file of the load job (as illustrated in FIG. 3), if an error and/or interruption occurs (e.g., due to memory usage errors, corrupted data, etc.) while loading to the stage database 114 (as an intermediary), uncertainty as to what data was loaded to the task database 116 may not be an issue, as the access engine 112 merely restarts the load to the stage database 114 in response to the error and/or interruption.

Finally, once the data structure is loaded to the stage database 114, the access engine 112 transfers the data (i.e., the data structures) from the stage database 114 to the task database 116, at 314, for example, by using an insert from a sub-select statement (e.g., INSERT INTO P41.TIPAIPB (SELECT * FROM P41.TIPAIPS), etc.). The method 300 is then complete for that particular file to be loaded from the backup database 110. When an additional file in the backup database 110 is identified (e.g., when created, etc.), the method 300 will begin again at 302 and repeat as described above.

Subsequently, when all desired files are loaded to the task database 116, the task database 116, as loaded with the data and/or data structures specific to the load job, is available to be queried to enable the interchange adjustment(s) for the given task. The queries may be SQL queries, which are then permitted to perform merge and/or join operations within the task database 116 (i.e., operations unavailable in the flat files contained within the backup database 110.). The queries are enabled by the indexing and/or block organization provided by the IDAA loader, where the data, as read in from the flat file format of the backup database 110 to the stage database 114 (and then to the task database 116) is organized into blocks (e.g., based on one or more criteria, etc.), whereby the data in the task database 116 can be more efficiently identified within a range of the block and read, as compared to identifying and reading the data sequentially from the start of the file as necessary for the original flat file of the backup database 110. In other words, in connection with the IDAA loader, the search capability allows key extraction of data records being searched for without reading every record sequentially to find the desired ones.

As illustrated in FIG. 3, if any of the above operations (e.g., appending the filename to the index at 308, changing the global variable to the filename at 310, loading the data at 312, transferring the data at 314, etc.) fails, the access engine 112 cancels the load job, at 306.

In view of the above, the systems and method herein provide access (using the IDAA loader, for example) to data in a rational way, rather than in one or more flat files. In this manner, series data accessed in each file may be omitted, and replaced with one or more SQL queries (with filters, for example) to retrieve the data. As such, data pulled for the interchange adjustment process, for example, which are substantial amounts of data (e.g., data including upwards of 100 Terabytes or more (e.g., about 160 million rows of data (i.e., a row per transaction, etc.), per day for one or multiple months, etc.), whereby the data is static or continues to accumulate daily (or at some other interval), etc.) may be reduced from about six and one half hours to access the flat files, depending on a particular computing device, to about fifteen minutes (for the same data) in the rationally organized data by using the IDAA loader as described herein. Furthermore, the use of the stage database 114 (as an intermediary) provides for fault tolerance and/or isolation, as described above. In particular, the stage database is employed herein to provide isolation from the task database 116 in order to provide for error protection (e.g., in case of one or more failures in the method 300, etc.). That is, the loading of the flat file from the backup database to the stage database is time consuming given the number of reads from the file, the organization of the data into blocks within the IDAA, and/or the disparate flat files from which data is to be read. The loading, thus, may be subject to errors and/or interruptions, for example, due to a server crashing or failing, flat file corruption, software errors, running out of memory, etc. When such errors and/or interrupts occur, the last attempted load to the stage database is all that is needed for reload. There is no proliferation of the error to the task database 116. That said, the loading of the data from the stage database to the task database, in a byte comparison, is much less time consuming (e.g., on the order of minutes, as compared to an hour or more for the flat file to be loaded to the stage database, for a given amount of data and/or number of flat files, etc.) and much less prone to errors and/or interruptions (given the operation). As can be seen, at the least, this results in a significant time savings in original data or recovery generation.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or databases and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing a backup database, the backup database including multiple flat data files, each of the multiple flat data files including data and having a filename; (b) appending, by a computing device, the filename of one of the multiple flat data files to an index stored in the computing device; (c) changing, by the computing device, a global variable associated with a data loader for the one of the multiple flat data files to the filename; (d) loading, by the computing device, the data from the one of the multiple flat data files into a stage database in memory of the computing device; (e) transferring, by the computing device, the loaded data in the stage database to a task database, thereby making the data available to queries associated with tasks relying on the loaded data; (f) determining whether the filename is in the index, prior to appending the filename to the index; (g) when the filename is present in the index, cancelling the load job; and (h) querying, by a task computing device, the task database for at least two data structures loaded into the task database based on a common element in the at least two data structures.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in loading data associated with a load job from a backup database to a task database, the system comprising:
    a backup database including multiple flat files, each of the multiple flat files including data;
    a stage database;
    a task database; and
    an engine computing device coupled to each of the backup database, the stage database, and the task database, the engine computing device configured to:
        determine whether a filename of one of the multiple flat files included in the backup database is included in an index;
        in response to a determination that the filename of the one of the multiple flat files is not present in the index:
            append the filename of the one of the multiple flat files to the index;
            change a global variable associated with the one of the multiple flat files to the filename;
            load the data from the one of the multiple flat files into the stage database; and transfer the loaded data, for the one of the multiple flat files, from the stage database to the task database, thereby making the data available to queries, at the task database, where the queries are associated with tasks relying on the loaded data in the task database.

2. The system of claim 1, wherein the engine computing device is further configured to purge data from a data structure included in the stage database; and wherein the engine computing device is configured to load the data from the one of the multiple flat files into the purged data structure of the stage database.

3. The system of claim 1, wherein the engine computing device is further configured to cancel the load job in response to a determination that the filename of the one of the multiple flat files is present in the index.

4. The system of claim 1, wherein each of the stage database and the task database are defined by an IDAA database.

5. The system of claim 4, wherein the engine includes at least one IDAA data loader including the global variable.

6. The system of claim 1, wherein the task database is configured to respond to an SQL query with data from at least two files when the SQL query includes a common element in the at least two files.

7. A computer-implemented method for use in loading data associated with a load job from a backup database to a task database, the method comprising:

accessing a backup database, the backup database including multiple flat data files, each of the multiple flat data files including data;

confirming, by a computing device, a filename of one of the multiple flat data files is not included in an index; and then appending, by the computing device, the filename of the one of the multiple flat data files to the index;

changing, by the computing device, a global variable associated with a data loader for the one of the multiple flat data files to the filename;

loading, by the computing device, data from the one of the multiple flat data files into a stage database in memory of the computing device; and transferring, by the computing device, the loaded data in the stage database to a task database, thereby making the data from the one of the multiple flat data files available to queries associated with tasks relying on the loaded data in the task database.

8. The computer-implemented method of claim 7, wherein loading the data from the one of the multiple flat data files includes purging any data included in a data structure of the stage database and then appending the data from the one of the multiple flat files into the purged data structure of the stage database.

9. The computer-implemented method of claim 7, wherein each of the stage database and the task database are defined by an IDAA database.

10. The computer-implemented method of claim 9, further comprising querying, by a task computing device, the task database for at least two data structures loaded into the task database based on a common element in the at least two data structures.

11. A non-transitory computer-readable storage media comprising computer-executable instructions for loading data associated with a load job from a backup database to a task database, which when executed by at least one processor, cause the at least one processor to:

access a backup database, the backup database including multiple flat files, each of the multiple flat files associated with a load job;

determine whether a filename associated with one of the multiple flat files is in an index;

in response to a determination that the filename associated with the one of the multiple flat files is not present in the index:

append the filename associated with the one of the multiple flat files to the index;

change a global variable for a data loader associated with the one of the multiple flat files to the filename;

load data from the one of the multiple flat files into a stage database; and transfer the data loaded to the stage database to a task database, thereby making the data available to queries at the task database associated with tasks relying on the loaded data in the task database.

12. The non-transitory computer-readable storage media of claim 11, wherein the executable instructions, when executed by the at least one processor, further cause the at least one processor to purge data from a data structure of the stage database and to then load the data from the one of the multiple flat files into the purged data structure of the stage database.

13. The non-transitory computer-readable storage media of claim 12, wherein the executable instructions, when executed by the at least one processor, further cause the at least one processor to cancel the load job in response to a determination that the filename of the one of the multiple flat files is present in the index.

14. The non-transitory computer-readable storage media of claim 12, wherein each of the stage database and the task database are defined by an IDAA database.

15. The non-transitory computer-readable storage media of claim 11, wherein the executable instructions, when executed by the at least one processor, further cause the at least one processor to query the task database for multiple data structures loaded into the task database based on at least one common element in the multiple data structures.

* * * * *